(12) United States Patent
Shi et al.

(10) Patent No.: US 6,641,257 B1
(45) Date of Patent: Nov. 4, 2003

(54) LIGHTFAST INK JET INKS

(75) Inventors: Fengying Shi, Westford, MA (US); Paul Doll, Acton, MA (US); Walter Wnek, Litchfield, NH (US); Michael Andreottola, Stoneham, MA (US)

(73) Assignee: American Ink Jet Corporation, Billerica, MA (US)

( * ) Notice: Subject to any disclaimer, the term of this patent is extended or adjusted under 35 U.S.C. 154(b) by 0 days.

(21) Appl. No.: 09/494,090

(22) Filed: Jan. 28, 2000

Related U.S. Application Data

(63) Continuation-in-part of application No. 09/322,756, filed on May 28, 1999.
(60) Provisional application No. 60/118,083, filed on Jan. 29, 1999, and provisional application No. 60/087,267, filed on May 29, 1998.

(51) Int. Cl.$^7$ .................................................. B41J 2/01
(52) U.S. Cl. ........................ 347/100; 347/96; 106/31.13
(58) Field of Search ........................ 347/100, 96, 101, 347/95; 106/31.48, 31.6, 31.27, 31.13

(56) References Cited

U.S. PATENT DOCUMENTS

| | | | | |
|---|---|---|---|---|
| 3,849,183 A | * | 11/1974 | Chick et al. ................. 428/452 |
| 5,254,160 A | * | 10/1993 | Beach et al. .............. 106/31.51 |
| 5,281,261 A | * | 1/1994 | Lin .......................... 106/31.65 |
| 5,509,957 A | | 4/1996 | Toan et al. ................ 106/20 R |
| 5,534,051 A | | 7/1996 | Lauw ....................... 106/22 R |
| 5,665,871 A | | 9/1997 | Pedrazzi ..................... 534/573 |
| 5,681,380 A | | 10/1997 | Nohr et al. ................ 106/20 A |
| 5,700,850 A | | 12/1997 | Nohr et al. ................... 522/34 |
| 5,725,641 A | * | 3/1998 | Macleod ..................... 106/31.5 |
| 5,851,273 A | * | 12/1998 | Morris et al. ................ 347/100 |
| 5,855,657 A | * | 1/1999 | Bergthaller et al. .......... 347/100 |
| 5,931,995 A | * | 8/1999 | Malhotra et al. ......... 106/31.58 |
| 6,184,268 B1 | * | 2/2001 | Nichols et al. .............. 523/160 |

FOREIGN PATENT DOCUMENTS

| | | | | |
|---|---|---|---|---|
| JP | 05239389 A | * | 9/1993 | ........... C09D/11/00 |
| JP | 11199808 A | * | 7/1999 | ............ B41M/5/00 |

OTHER PUBLICATIONS

Allen et al.; "Photo–Stabilising Action of Metal Chelate Stabilisers in Polypropylene: Part V–$_{Light}$ Stability as a Function of Concentration and Further Studies in Metal Stearate—Stabiliser Systems", Polymer Degradation and Stability 5 : 323–338 (1983).

Giles H. C. and Mckay B. R.; "The Lightfastness of a Dyes: a Review", Textile Research Journal, pp. 527–577, (Jul. 1963).

Van Beek, H. C. A.; "Light– Induced Colour Changes in Dyes and Materials", Color Research and Application, vol. 8, No. 3, pp. 176–181 (Fall 1983).

* cited by examiner

*Primary Examiner*—Judy Nguyen
*Assistant Examiner*—Manish Shah
(74) *Attorney, Agent, or Firm*—Foley Hoag LLP; William DeVaul

(57) ABSTRACT

An ink with improved lightfastness suitable for thermal ink jet printing contains at least an aqueous vehicle, a dye and a light stabilizer to protect the dye in the ink during exposure to light. Different additives as light stabilizer for individual inks were described herein. A UV Glossy substrate was found to reinforce the lightfastness of print.

54 Claims, No Drawings

LIGHTFAST INK JET INKS

This application is a continuation-in-part of U.S. patent application Ser. No. 09/322,756, filed May 28, 1999, based on U.S. Provisional Application No. 60/087,267, filed May 29, 1998, and is further based on U.S. Provisional Application No. 60/118,083, filed Jan. 29, 1999.

BACKGROUND OF THE INVENTION

1. Field of the Invention

This application relates to the field of inks and more particularly to the field of inks for ink jet printers.

2. Description of Related Art

Ink jet printing is a form of printing where very fine stable liquid droplets are discharged from an orifice and deposited onto a substrate. Use of three or more colored inks enables the user to produce full color images, text, or graphics. The ink jet printing industry is growing in parallel with the explosive development of other computer technology. Ink jet printers provide low cost, low maintenance, high speed, and high color printing quality for a wide variety of applications, from industrial labeling to office printing. However, although ink jet printing is used in more and more applications, problems with fading of the printed image when exposed to light continue plague the technology.

The printed colorants used in many ink jet inks fade when exposed to electromagnetic radiation in range of 290 nm to 1200 nm, a range present in sunlight and artificial light. This fading degrades image quality, and in many applications, such color fading is unacceptable. Accordingly, for an ink jet printer to be useful for a range of printing applications, ink jet inks and media are needed that are less susceptible to fading.

Ink colorants undergo photodecomposition via a number of oxidation and reduction mechanisms including but not limited to: electron ejection from the colorant, reaction with ground state or excited singlet state oxygen, and electron or hydrogen abstraction to form radical intermediates. While direct bond cleavage can occur, the spectral energies involved suggest that this is not a primary mechanism of photolysis of the colorants.

Which of the aforementioned mechanisms contribute to a colorant's photodecomposition depends on many factors. First, the chemical properties of the chosen colorant are critical to its lightfastness. Generally, a more chemically stable colorant fades less upon exposure to sunlight or artificial light. Most colorants are believed to be extremely resistant to photolysis in vacuo. This belief emphasizes the relationship of the chemical environment of the printed colorant to its lightfastness.

The substrate on which the printed ink is deposited is a part of the colorant's chemical environment, and thus can have a significant effect on lightfastness of the print. For example, cotton, rayon, and polyesters, commonly used in paper and other substrates, contain carbonyl groups. Carbonyl groups absorb light of wavelengths greater than 300 nm, such as are present in sunlight. The excitation of carbonyl groups can lead to reactive species capable of causing colorant fading. The physical characteristics of the substrate can also affect the printed colorant's environment. The nature of the substrate may determine, in part, how much of the colorant is held on the surface. The porosity of the substrate can also affect the penetration of moisture and gases into the colorant.

The components of the ink can also have an effect on the colorant's chemical environment, and can thus play a role in the lightfastness of the final print. The ink's humectants, pH buffers, biocides, other additives, and even colorless photodecomposed products can catalyze the photodecomposition of the printed colorant. Likewise, the components of other inks, including the colorant(s), that mix with the ink on the substrate can contribute to the fading of the print. A notable example of catalytic fading is found in phthalocyanine dyes that catalyze the fading of certain magenta dyes. For this reason, printed blacks made by combining cyan, magenta, and yellow inks tend to fade to green, and printed blues made with cyan and magenta tend to fade to cyan.

Other various environmental factors can also affect the fading rates of printed colors. These include but are not limited to: temperature, humidity, and pollutants/gaseous reactants such as $O_2$, $S_2$, and $NO_2$. Also of great importance to fading rate is the spectral distribution of the radiation incident on the printed colorant.

All of the factors that affect colorant fading are interdependent to varying degrees, so it is difficult to develop an ink suitable for all general substrates or a substrate suitable for all general ink jet inks. One mechanism that has been shown to provide general protection against most mechanisms of photodegradation is aggregation of the colorant molecules. The aggregation of colorant molecules tends to reduce catalytic fading by reducing the surface area of the colorant per unit of mass that is subject to oxygen and light exposure. This point is clearly demonstrated with pigmented colorants. However, pigmented colorants tend to clog the small orifices used in ink jet printers.

Accordingly, there is a need to identify light-stable dyes suitable for ink jet printing that can be used independently or in combination and be resistant to color fading under typical environmental conditions.

SUMMARY OF THE INVENTION

The present invention provides a set of aqueous ink jet inks with improved lightfastness.

It is an object of the invention to provide an ink jet ink set with improved lightfastness suitable for thermal, piezo, or continuous ink jet printing which comprises an aqueous vehicle, a colorant, a light stabilizer to protect the colorant in the ink during exposure to light, and optionally a humectant and/or a biocide.

It is an object of the present invention to provide a combination of an ink jet ink with improved lightfastness and a substrate that reinforces the lightfastness of the ink jet ink.

It is an object of the invention to provide a combination of an ink jet ink with a printing medium that is substantially carbonyl-free.

It is an object of the invention to provide an ink jet ink set substantially stable to light or UV radiation.

Thus, in one aspect, the systems and methods described herein relate to an ink suitable for ink jet printing, comprising an aqueous vehicle, a dye having an excitation energy, and a stabilizer capable of absorbing energy of wavelengths similar to the excitation energy of the dye. In certain embodiments, the dye is substantially lightfast. In certain embodiments, the dye is a phthalocyanine dye. In certain embodiments, the dye is an azo dye. In certain embodiments, the ink includes two magenta dyes, of which one dye includes a copper complex.

In certain embodiments, the ink further includes a biocide, whereby the dye is substantially lightfast in the presence of the biocide. The biocide may be selected from 1,2- benzisothiazolin-3-one, 2-methyl-4,5-trimethylene-4-isothiazolin-3-one, 1-(3-chloroallyl)-3,5,7-triaza-1-azoniaadamantane, and 6-acetoxy-2,4-dimethyl-1,3-dioxane.

In certain embodiments, the ink further includes a humectant, whereby fading of the dye is not promoted in the presence of the humectant. The humectant may be selected from glycerin, propylene glycol, ethylene glycol, 1,5-pentanediol, di(ethylene glycol), poly(ethylene glycol)-200, poly(propylene glycol)-425, di(propylene glycol), propylene glycol, triethylene glycol, poly(ethylene glycol)-300, 2-pyrrolidone, thiodiglycol, dimethyl imidazolidinone, glycerin, acetamide, urea, N-methyl urea, N-allyl urea, ethoxylated glycerin, sorbitol, ethoxylated glucose, dimethoxyethane, diethoxyethane, ethyleneglycol diacetate, and glycinamide hydrochloride. In certain embodiments, the dye is a yellow dye and the ink is substantially free of N-methylpyrrolidone.

In certain embodiments, the ink further includes a surfactant, and wherein the dye is substantially lightfast in the presence of the surfactant. The surfactant may be selected from non-ionic surfactants, sodium decyl diphenyl oxide disulfonate, alkyloxypolyethyleneoxyethanol, and polyoxypropylene methyl diethyl ammonium chloride.

In certain embodiments, the ink includes a yellow dye and at least one light stabilizer selected from 2,2'-dihydroxy-4,4'-dimenthoxybenzophenone-5,5'-bis(sodium sulfonate), 5-benzoyl-4-hydroxy-2-methoxybenzenesulfonic acid, histidine, and cupric sulfate. The yellow dye may include Reactive Yellow 37, Direct Yellow 107, Acid Yellow 17, Direct Yellow 86, or Direct Yellow 132.

In certain embodiments, the ink includes a magenta dye and at least one light stabilizer selected from a 4-bis(polyethoxy)aminoacidpolyethoxyethyl ester, 2,2'-dihydroxy-4,4'-dimenthoxybenzophenone-5,5'-bis(sodium sulfonate), 5-benzoyl-4-hydroxy-2-methoxybenzenesulfonic acid, 2-phenylbenzimidazole-5-sulfonic acid, histidine, and cupric sulfate. The magenta dye may include Direct Red 75, Reactive Red 23, Reactive Red 180, Direct Red 212, Acid Red 52, Acid Red 37, or Acid Red 289.

In certain embodiments, the ink includes a cyan dye and at least one light stabilizer selected from 2-phenylbenzimidazole-5-sulfonic acid, 5-benzoyl-4-hydroxy-2-methoxybenzenesulfonic acid, 4-bis(polyethoxy) aminoacidpolyethoxyethyl ester, and 5-benzoyl-4-hydroxy-2-methoxybenzenesulfonic acid. The cyan dye may include Direct Blue 199 or Direct Blue 86.

In another aspect, the invention provides a method for printing by preparing an ink jet printer with an ink as described above, disposing a sheet of substantially carbonyl-free paper in the printer, and depositing the ink on the paper.

In another aspect, the invention relates to an ink jet printer comprising an ink as described above. The printer may further include paper that is substantially free of carbonyls.

In yet another aspect, the invention relates to an ink jet printer cartridge comprising an ink as described above.

In still another embodiment, the invention provides an ink set suitable for ink jet printing, comprising a cyan ink including a substantially lightfast cyan dye, a magenta ink including a substantially lightfast magenta dye, and a yellow ink including a substantially lightfast yellow dye. In certain embodiments, the cyan dye is a phthalocyanine dye. In certain embodiments, the magenta dye includes an azo dye. In certain embodiments, the magenta ink includes two magenta dyes. In certain embodiments, at least one magenta dye includes a copper complex. In certain embodiments, the ink set further includes a black ink including a substantially lightfast black dye, such as Direct Black 19. In certain embodiments, each dye is substantially lightfast in the presence of one or more of the other dyes in the ink set.

In certain embodiments, at least one ink further includes a biocide as described above, selected such that the dye in the at least one ink is substantially lightfast in the presence of the biocide. In certain embodiments, at least one ink further includes a humectant as described above, selected such that the dye in the at least one ink is substantially lightfast in the presence of the humectant. In certain embodiments, the ink set is substantially free of N-methylpyrrolidone. In certain embodiments, at least one ink further includes a surfactant as described above, selected such that the dye in the at least one ink is substantially lightfast in the presence of the surfactant. In certain embodiments, at least one ink further includes an ultraviolet absorber, selected such that the ultraviolet absorber is capable of absorbing energy at a wavelength similar to the excitation energy of the dye in the at least one ink.

In one aspect, the invention relates to ink jet cartridge comprising an ink set as described above. In another aspect, the invention relates to an ink jet printer loaded with an ink set as described above. In certain embodiments, the printer may further be loaded with paper substantially free of carbonyls.

In yet another aspect, the systems and methods described herein relate to a method for printing by preparing an ink jet printer with an ink set as described above, loading a sheet of substantially carbonyl-free paper into the printer, and disposing ink from the ink set on the paper.

In yet a further aspect, the invention relates to a residue disposed on a surface, the residue comprising a dye having an excitation energy, and a stabilizer capable of absorbing energy of wavelengths similar to the excitation energy of the dye. In certain embodiments, the surface is paper, e.g., paper substantially free of carbonyls. In certain embodiments, the dye is substantially lightfast in the presence of the other components of the residue.

In certain embodiments, the dye is a phthalocyanine dye. In certain embodiments, the dye includes an azo dye. In certain embodiments, the residue includes two magenta dyes, of which one dye includes a copper complex.

In certain embodiments, the residue further includes a biocide as described above, whereby the dye is substantially lightfast in the presence of the biocide. In certain embodiments, the residue further includes a humectant as described above, whereby the dye is substantially lightfast in the presence of the humectant. In certain embodiments, the dye is a yellow dye and the residue is substantially free of N-methylpyrrolidone. In certain embodiments, the residue further includes a surfactant as described above, whereby the dye is substantially lightfast in the presence of the surfactant.

In certain embodiments, the residue further includes a second dye. In certain embodiments, each dye is substantially lightfast in the presence of the other dye.

In certain inks described herein, the ink includes 0.2–10.0 weight % of magenta dye, including one or more of Direct Red 75, Reactive Red 23, Reactive Red 180, Direct Red 212, Acid Red 52, Acid Red 37, Acid Red 289, or a water soluble cupric phthalocyanine dye.

In certain inks described herein, the ink includes 0.2–15.0 weight % yellow dye, including one or more of Direct Yellow 107, Reactive Yellow 37, Direct Yellow 132, and Direct Yellow 86.

In certain inks described herein, the ink includes 0.2–10.0 weight % cyan dye, including one or more of Direct Blue 199 and Direct Blue 86.

In yet another embodiment, the systems and methods described herein provide an ink set suitable for ink jet printing, comprising a cyan ink including substantially lightfast cyan dye and a stabilizer capable of absorbing energy of wavelengths similar to the excitation energy of the cyan dye, a magenta ink including a substantially lightfast magenta dye and a stabilizer capable of absorbing energy of wavelengths similar to the excitation energy of the magenta dye, and a yellow ink including a substantially lightfast yellow dye and a stabilizer capable of absorbing energy of wavelengths similar to the excitation energy of the yellow dye. In certain embodiments, each ink is an aqueous ink.

DETAILED DESCRIPTION OF THE SELECTED EMBODIMENTS

The description below pertains to several possible embodiments of the invention. It is understood that many variations of the systems and methods described herein may be envisioned by one skilled in the art, and such variations and improvements are intended to fall within the scope of the invention. Accordingly, the invention is not to be limited in any way by the following disclosure of certain illustrative embodiments.

The inks and ink sets disclosed herein employ one or more techniques for improving the lightfastness of the inks, either singly or used in combination. An ink for ink jet printing may comprise an aqueous vehicle, a substantially lightfast colorant, and a light stabilizer to protect the colorant in the ink during exposure to electromagnetic radiation in the range from 290 nm through 1200 nm. In preferred embodiments, the light stabilizer is selected to absorb radiation, especially UV radiation, approximately at a wavelength that promotes fading of the colorant.

More than one color of ink is needed to produce images of more than one color. An ink set, as the term is used herein, is a set of three or more inks of different colors which can be used in combination to produce a spectrum of printed colors. An ink set may comprise, for example, magenta, cyan, and yellow inks, optionally further including a black ink. Combinations of these dyes can produce a full spectrum of colors. Printed colors are typically made by the applying different amounts of each of the colored inks on the printing medium. As is known to those of skill in the art, the same colorant may be used in a plurality of inks at different concentrations to achieve smoother tonal transitions.

Since chromatic color is not required for black colorants, there are many lightfast dyes currently available. Because of this, metallized dyes may be used, as well as larger aggregated polyazo dyes such as Color Index (referred to as C.I. hereinafter) Direct Black 19. For cyan colorants, it is well known by those of skill in the art that phthalocyanine dyes have generally good stability under a variety of conditions. For a yellow colorant, a wide variety of yellow dyes that exhibit adequate lightfastness may be used, including some dyes currently used in conventional ink jet ink formulations. It is generally understood by those of skill in the art that conventional magenta dyes are less stable under adverse light conditions than are cyan and yellow dyes. The relative instability of magenta and black dyes underlay a longstanding preference for pigment-based inks for use in many applications, including ink jet printing inks, even though such dyes may clog the printing nozzles. In colorants, the chromophore and the auxiliary group of the dye both have a significant effect on lightfastness. Magenta dyes in the class of azo dyes tend to have superior lightfastness.

In an embodiment of the invention, the black dye is a purified form of a water-soluble metalized dye or a large aggregated polyazo dye, such as C.I. Direct Black 19. A black ink may have a dye concentration ranging from 0.1 to 25.0 percent by weight, preferably from 0.2 to 15.0 percent, and more preferably 0.2 to 12.0 percent. In an embodiment of the invention, the cyan dye is a purified form of a water-soluble, metalized phthalocyanine with the associated metal being copper, nickel, or cobalt, with the preferred cyan dye being a sulfonated copper phthalocyanine, and more preferred being a purified form of C.I. Direct Blue 86 or C.I. Direct Blue 199 or a combination thereof. A cyan ink may have a dye concentration ranging from 0.1 to 20.0 percent by weight, preferably from 0.2 to 10.0 percent, and more preferably 0.2 to 6.0 percent. In an embodiment of the invention the yellow dye is a purified form of a water-soluble azo dye, preferably C.I. Acid Yellow 17, C.I. Direct Yellow 132, C.I. Direct Yellow 107, C.I. Direct Yellow 86, C.I. Reactive Yellow 37, or combinations of these dyes or their analogs. A yellow ink may have a dye concentration ranging from 0.1 to 30.0 percent by weight, preferably from 0.2 to 15.0 percent, and more preferably from 0.2 to 8.0 percent. In an embodiment of the invention, the magenta dye is a purified form of a water-soluble azo dye the fading of which is not substantially accelerated by a cyan dye in the ink set, such as C.I. Direct Red 75, C.I. Reactive Red 23, C.I. Acid Red 37, C.I. Reactive Red 180, C.I. Direct Red 212, or combinations of these dyes or their analogs. A magenta ink may have a dye concentration ranging from 0.1 to 15.0 percent by weight, preferably from 0.2 to 10.0 percent, and more preferably from 0.2 to 8.0 percent.

The addition of some surfactants can diminish the lightfastness of the formulated ink because of the existence of light-sensitive chemical groups in the surfactant structure. Surfactants, as the term is used herein, include compounds having a hydrophilic (e.g., polar or ionic) moiety and a hydrophobic (e.g., non-polar or lipophilic) moiety, such as alkyl sulfates or phosphates, alkylammonium salts, etc. Accordingly, in an embodiment of the invention, a surfactant that does not absorb and/or is inert to radiation from 290 nm to 1200 nm is included to improve the print quality of the ink.

The aqueous ink formulations described herein may also include a suitable organic solvent, e.g., a solvent miscible with water. Suitable solvent types include ethers, such as THF, glyme, diglyme, and polyethers, alcohols, such as methanol, ethanol, propanol, isopropanol, ethylene glycol, propylene glycol, di(propylene glycol), poly(propylene glycol)-425, di(ethylene glycol), tri(ethylene glycol), poly(ethylene glycol)-200, poly(ethylene glycol)-300, pentaerythritol, ethoxylate (3/4 EO/OH), 1,5-pentanediol, glycerin, etc., and other water-miscible organic solvents, such as dimethylformamide, dimethylsulfoxide, N-methylpyrrolidone, etc. Glycerol is a preferred cosolvent. Preferably, such cosolvents, which may act as humectants in the present formulations, do not contribute to fading of or otherwise react with the dyes used in the inks or ink sets dyes. However, such concerns may be diminished by selecting a volatile solvent that substantially evaporates from the ink after printing.

A biocide may also be included in an ink formulation. A biocide is any compound which inhibits the growth of microbes or other life forms, such as yeast, bacteria, algae, or fungus, in the ink. Preferably, a biocide which does not react with or otherwise to the fading of a dye in the ink or ink set may be selected for this purpose.

Preferably, a substrate for printing, such as paper, is selected to be substantially free of carbonyls in order to reduce the contribution of the substrate to fading of the inks disposed on the surface. Various papers having this characteristic are available from common sources as described in greater detail below.

In an embodiment of the invention, the cyan ink component comprised the following elements: cyan dye, a humectant, such as glycerin, an ultraviolet absorber, such as givsorb UV, a biocide, such as 1,2-benzisothiazolin-3-one, and water. In an embodiment, the cyan ink comprised the following elements in the following amounts: Direct Blue 199, 0.5 to 10 parts, preferably 1.5–5.0 parts, and more preferably 2.0–3.0 parts; glycerin, 2.0–15.0 parts, preferably 5.0–12.0 parts; Eusolex 232 (2-Phenylbenzimidazole-5-Sulfonic acid), 0.1 to 5.0 parts, preferably 0.2 to 2.0 parts; 1,2-benzisothiazolin-3-one, 0.1 to 1.0 parts, preferably 0.1 to 0.5 parts; and parts, preferably 70 to 90 parts.

In an embodiment of the invention, the magenta ink component comprises the following elements: magenta dye; a humectant, such as glycerine; an antioxidant, such as monohydrate hypophosphite sodium salt; a biocide, such as 1,2-benzisothiazolin-3-one; an ultraviolet light stabilizer, such as 2,2'-dihydroxy-4,4'-dimethoxybenzophenone-5,5'-bis(sodium sulfonate) sold commercially by BASF as 4-bis (polyethoxy)aminoacidpolyethoxy ethyl ester); and water. In an embodiment, these components were the following in the following ratios: Direct Red 75, 2.0 to 12.0 parts, preferably 3.0 to 9.0 parts; glycerin, 2.0 to 15.0 parts, preferably 5.0 to 12.0 parts; monohydrate hypophosphite sodium salt, 0.01 to 1.0 parts, preferably 0.05 to 0.5 parts; 1,2-benzisothiazolin-3-one, 0.1 to 1.0 parts, preferably 0.1 to 0.5 parts; 4-bis(polyethoxy)aminoacidpolyethoxy ethyl ester), 0.1 to 5.0 parts, preferably 0.2 to 2.0parts; and water, 50 to 90 parts, preferably 70 to 90 parts.

In an embodiment of the invention, the yellow ink component comprises yellow dye, a humectant, a light stabilizer, a biocide, and water. In embodiment of the invention, these components are the following in the following ratios: Direct Yellow 132, 10.0 to 50.0 parts, preferably 15.0 to 40.0 parts; glycerin, 2.0 to 15.0 parts, preferably 5.0 to 12.0 parts; 2,2'-dihydroxy-4,4'-dimethoxybenzophenone-5,5'-bis (sodium sulfonate)), 0.1 to 5.0 parts, preferably 0.2 to 2.0 parts; 1,2-benzisothiazolin-3-one, 0.1 to 1.0 parts, preferably 0.1 to 0.5 parts; and water, 30 to 90 parts, preferably 40 to 80 parts.

In an embodiment of the invention, the black ink component comprises black dye, a humectant, a biocide, and water. In an embodiment of the invention, the following components are present in the following ratios: Direct Black 19, 5.0 to 40.0 parts, preferably 15.0 to 30.0 parts; glycerin, 8.0 parts; 1,2-benzisothiazolin-3-one, 0.1 to 1.0 parts, preferably 0.1 to 0.5 parts; and water, 30 to 90 parts, preferably 50 to 80 parts.

The systems and methods disclosed herein also include ink jet printers containing a lightfast ink or lightfast ink set. In certain embodiments, such printers may further be loaded with paper substantially free of carbonyls. The systems and methods disclosed herein also include ink jet printer cartridges, such as replacement ink cartridges, containing one or more lightfast inks as described herein. The systems and methods disclosed herein relate further to paper, including paper substantially free of carbonyls, printed with one or more inks of the present invention, e.g., bearing a residue left from the evaporation of solvent or other volatile compounds from one or more lightfast inks as described herein.

EXEMPLIFICATION

The invention, now being generally described, will be more readily understood by reference to the following examples, which are included merely for purposes of illustrating of certain aspects and embodiments of the present invention and are not intended to limit the invention.

Dyes which individually exhibit relatively good lightfastness and suitable color space were screened in combination to test the lightfastness of each dye in the resulting mixture. The ink sets below generally contain yellow, cyan, magenta, and optionally black dyes. Unless indicated otherwise in connection with a particular example, each ink was formulated and filtered under pressure through a membrane filter having a pore size of 0.22 μm. The resulting inks were used to print cyan, yellow, magenta, red, blue, green, and process black samples. Generally, lightfastness was tested on an Atlas Xenon-Arc Fadometer device, and the printing medium was lightfastness reinforced paper, such as UV-Glossy available from American Ink Jet Corporation.

The results suggest that cupric complex cyan dyes promote significant fading of certain azo magenta dyes when the print is laminated or exposed to high moisture. Thus, dyes which remain substantially lightfast in combination with different dyes are preferably used in ink sets of the present invention.

The fading rate, especially the catalytic fading rate, is greatly influenced by many factors, including but not limited to the chemical composition of the substrate, temperature, humidity, presence of gases such as $O_2$, $SO_2$, and $NO_2$, and the spectral distribution of the radiation incident on the printed colorant. For example, cupric complex cyan dyes catalyze the fading of certain azo magenta dyes significantly when the print is laminated or exposed to high moisture. Accordingly, fading of a number of magenta dyes was evaluated under varying conditions. Suitable magenta dyes were printed on various substrates and then evaluated in both laminated and unlaminated substrates under four different exposure conditions (high intensity xenon arc exposure, high output fluorescent lamps, natural exposure in Miami, Fla., and natural exposure in Phoenix, Ariz.). Optical densities of the printed samples were measured before exposure and periodically during the exposure to determine fade rates. A summary screening of magenta dyes can be found in Table 2, and data regarding the catalytic fading caused by C.I. Direct Blue 199 can be found in Table 3. While fading rates varied under the different exposure conditions, the presence of catalytic fading of laminated print samples was independent of exposure conditions. Catalytic fading, as the term is used herein, refers to a greater optical density loss of colorant, such as magenta dye, in a combination of dyes, such as in the printed process black, than in the colorant printed by itself. Two dyes evaluated were not photocatalyzed by C.I. Direct Blue 199. Furthermore, the print from the set of inks made with C.I. Reactive Red 180 lasted more than 100 days under lamination in the amount of outside light exposure in Miami when printed on a substantially carbonyl-free media. The print from the set of inks made with C.I. Direct Red 212 lasted more than 200 days under lamination in the amount of outside light exposure in Miami when printed on a substantially carbonyl-free media. Combinations of these dyes also do not exhibit substantial catalytic fading and may be preferred.

In the embodiments of the invention described below, ink sets each contain cyan, yellow, magenta and black dyes. Unless indicated otherwise in connection with a particular example, the four color components were mixed, and the resultant mixtures were filtered under vacuum through a membrane filter having a pore size of 0.22 μm. In each example, lightfastness was tested on an Atlas SUNTEST CPS device and/or an Atlas Ci3000 weatherometer, and the printing medium was a glossy ink jet paper, such as UVGlossy available from American Ink Jet Corporation.

Examples of ink sets of the present invention include but are not limited to the following:

EXAMPLE 1

8.0 g Glycerol, 0.2 g 1,2-benzisothiazolin-3-one, 0.1 g monohydrate hypophosphite sodium salt, 0.25 g 4-bis (polyethoxy)aminoacidpolyethoxy ethyl ester, and 85.45 g water were mixed together by stirring at room temperature, and after a homogeneous solution was obtained, 8.0 g magenta azo dye, namely, Direct Red 75, was added into the solution. The colored ink was stirred for about fifteen minutes until the mixture became homogeneous again. This ink was then filtered under vacuum through a membrane filter with a pore size 0.22 μm.

Based on an end solution of one hundred parts, glycerol, 8.0 parts, 2-phenylbenzimidazole-5-sulfonic acid, 0.5 parts, 1,2-benzisothiazolin-3-one, 0.2 parts, and water, 88.8 parts, were mixed together by stirring at room temperature until a homogeneous solution was obtained. Next, cyan dye, namely, Direct Blue 199, 2.5 parts, was added into the solution, and the colored ink was stirred for about fifteen minutes until the mixture became homogeneous again. This ink was then filtered under vacuum through a membrane filter with a pore size 0.22 μm.

Based on an end solution of one hundred parts, glycerol, 6.0 parts, 2,2'-dihydroxy-4,4'-dimethoxybenzophenone-5,5'-bis(sodium sulfonate), 0.5 parts, 2-methyl-4,5-trimethylene-4-isothiazolin-3-one, 0.2 parts, and water, 73.7 parts, were mixed together by stirring at room temperature until a homogeneous solution was obtained. Next, yellow dye, Direct Yellow 132, 20.0 parts, was added into the solution, and the colored ink was stirred for about fifteen minutes until the mixture became homogeneous again. This ink was then filtered under vacuum through a membrane filter with a pore size 0.22 μm.

Optionally, the ink set further includes the following black ink. Based on an end solution of one hundred parts, glycerin, 8.0 parts, 1,2-benziaothiazolin-3-one, 0.2 parts, and water, 71.8 parts, were mixed together by stirring at room temperature until a homogeneous solution was obtained. Next, black dye, Direct Black 19, 20.0 parts, was added to the solution, and the colored ink was stirred for about fifteen minutes until the mixture became homogeneous again. This ink was then filtered under pressure through a membrane filter with a pore size 0.22 μm.

EXAMPLE 2

8.0 g Glycerol, 0.2 g 1,2-benzisothiazolin-3-one, 0.1 g monohydrate hypophosphite sodium salt, 0.25 g 4-bis (polyethoxy)aminoacidpolyethoxy ethyl ester, and 89.45 g water were mixed together by stirring at room temperature until the mixture was a homogeneous solution. Next, magenta dye, namely, 2.0 g Reactive Red 152, was added into the solution. The colored ink was stirred for about fifteen minutes until the mixture became homogeneous again. This ink was then filtered under pressure through a membrane filter with a pore size 0.22 μm.

Based on an end solution of one hundred parts, glycerol, 8.0 parts, 2-phenylbenzimidazole-5-sulfonic acid, 0.5 parts, 1,2-benzisothiazolin-3-one, 0.2 parts, and water, 88.8 parts, were mixed together by stirring at room temperature until a homogeneous solution was obtained. Next, cyan dye, namely, Direct Blue 199, 2.5 parts, was added into the solution, and the colored ink was stirred for about fifteen minutes until the mixture became homogeneous again. This ink was then filtered under pressure through a membrane filter with a pore size 0.22 μm.

Based on an end solution of one hundred parts, glycerol, 6.0 parts, 2,2'-dihydroxy-4,4'-dimethoxybenzophenone-5,5'-bis(sodium sulfonate), 0.5 parts, 2-methyl-4,5-trimethylene4-isothiazolin-3-one, 0.2 parts, and water, 73.7 parts, were mixed together by stirring at room temperature until a homogeneous solution was obtained. Next, yellow dye, Direct Yellow 132, 20.0 parts, was added into the solution, and the colored ink was stirred for about fifteen minutes until the mixture became homogeneous again. This ink was then filtered under pressure through a membrane filter with a pore size 0.22 μm.

Optionally, this set may include the black ink of Example 1.

EXAMPLE 3

6.0 g Glycerol, 0.2 g 1,2-benzisothiazolin-3-one, 0.1 g monohydrate hypophosphite sodium salt, 0.25 g 4-bis (polyethoxy)aminoacidpolyethoxy ethyl ester, and 92.2 g water were mixed together by stirring at room temperature until a homogeneous solution was obtained. Then magenta dye, namely, 1.5 g Acid Red 52, was added into the solution, and the colored ink was stirred for about fifteen minutes until the mixture became homogeneous again. This ink was then filtered under pressure through a membrane filter with a pore size 0.22 μm.

Based on an end solution of one hundred parts, glycerol, 8.0 parts, 2-phenylbenzimidazole-5-sulfonic acid, 0.5 parts, 1,2-benzisothiazolin-3-one, 0.2 parts, and water, 88.8 parts, were mixed together by stirring at room temperature until a homogeneous solution was obtained. Next, cyan dye, namely, Direct Blue 199, 2.5 parts, was added into the solution, and the colored ink was stirred for about fifteen minutes until the mixture became homogeneous again. This ink was then filtered under pressure through a membrane filter with a pore size 0.22 μm.

Based on an end solution of one hundred parts, glycerol, 6.0 parts, 2,2'-dihydroxy-4,4'-dimethoxybenzophenone-5,5'-bis(sodium sulfonate), 0.5 parts, 2-methyl-4,5-trimethylene-4-isothiazolin-3-one, 0.2 parts, and water, 73.7 parts, were mixed together by stirring at room temperature until a homogeneous solution was obtained. Next, yellow dye, Direct Yellow 132, 20.0 parts was added into the solution, and the colored ink was stirred for about fifteen minutes until the mixture became homogeneous again. This ink was then filtered under pressure through a membrane filter with a pore size 0.22 μm.

Optionally, this set may include the black ink of Example 1.

EXAMPLE 4

8.0 g Glycerol, 0.2 g 1,2-benzisothiazolin-3-one, 0.5 g 2,2'-dihydroxy-4,4'-dimethoxybenzophenone-5,5'-bis (sodium sulfonate), 1.0 g isopropanol, and 70.3 g water were mixed together by stirring at room temperature until a homogeneous solution was obtained. Next, yellow dye, namely, 20.0 parts of Direct Yellow 132, was added into the solution, and the colored ink was stirred for about fifteen minutes until the mixture became homogeneous again. This ink was then filtered under pressure through a membrane filter with a pore size 0.22 μm.

Based on an end solution of one hundred parts, glycerol, 8.0 parts, 2-phenylbenzimidazole-5-sulfonic acid, 0.5 parts, 1,2-benzisothiazolin-3-one, 0.2 parts, and water, 88.8 parts, were mixed together by stirring at room temperature until a homogeneous solution was obtained. Next, cyan dye, namely, Direct Blue 199, 2.5 parts, was added into the solution, and the colored ink was stirred for about fifteen minutes until the mixture became homogeneous again. This ink was then filtered under pressure through a membrane filter with a pore size 0.22 μm.

Based on an end solution of one hundred parts, glycerol, 6.0 parts, monohydrate hypophosphite sodium salt, 0.1 parts, 1,2-benzisothiazolin-3-one, 0.2 parts, 4-bis (polyethoxy)aminoacidpolyethoxy ethyl ester, 0.25 parts, and water, 85.7 parts, were mixed together by stirring at room temperature until a homogeneous solution of the mixture was obtained. Next, magenta dye, namely, Direct Red 75, 8.0 parts was added into the solution, and the colored ink was stirred for about fifteen minutes until the mixture became homogeneous again. This ink was then filtered under pressure through a membrane filter with a pore size 0.22 μm.

Optionally, the black ink of Example 1 may be included in this set.

EXAMPLE 5

8.0 g Glycerol, 0.2 g 1,2-benzisothiazolin-3-one, 0.5 g 2,2'-dihydroxy-4,4'-dimethoxybenzophenone-5,5'-bis (sodium sulfonate), 1.0 g isopropanol, and 85.3 g water were mixed together by stirring at room temperature until a homogeneous solution was obtained. Next, yellow dye, namely, 5.0 g Reactive Yellow 37, was added into the solution, and the colored ink was stirred for about fifteen minutes until the mixture became homogeneous again. This ink was then filtered under pressure through a membrane filter with a pore size 0.22 μm.

Based on an end solution of one hundred parts, glycerol, 8.0 parts, 2-phenylbenzimidazole-5-sulfonic acid, 0.5 parts, 1,2-benzisothiazolin-3-one, 0.2 parts, and water, 88.8 parts, were mixed together by stirring at room temperature until a homogeneous solution was obtained. Next, cyan dye, namely, Direct Blue 199, 2.5 parts, was added into the solution, and the colored ink was stirred for about fifteen minutes until the mixture became homogeneous again. This ink was then filtered under pressure through a membrane filter with a pore size 0.22 μm.

Based on an end solution of one hundred parts, glycerol, 6.0 parts, monohydrate hypophosphite sodium salt, 0.1 parts, 1,2-benzisothiazolin-3-one, 0.2 parts, 4-bis (polyethoxy)aminoacidpolyethoxy ethyl ester, 0.25 parts, and water, 85.7 parts, were mixed together by stirring at room temperature until a homogeneous solution was obtained. Next, magenta dye, namely, Direct Red 75, 8.0 parts, was added into the solution, and the colored ink was stirred for about fifteen minutes until the mixture became homogeneous again. This ink was then filtered under pressure through a membrane filter with a pore size 0.22 μm.

Optionally, the black ink of Example 1 may be included in this set.

EXAMPLE 6

8.0 g Glycerol, 0.2 g 1,2-benzisothiazolin-3-one, 0.1 g monohydrate hypophosphite sodium salt, 0.25 g 4-bis (polyethoxy)aminoacidpolyethoxy ethyl ester, and 90.45 g water were mixed together by stirring at room temperature, and after a homogeneous solution was obtained, 3.0 g magenta azo dye, namely, Direct Red 212, was added into the solution. The colored ink was stirred for about fifteen minutes until the mixture became homogeneous again. This ink was then filtered under vacuum through a membrane filter with a pore size 0.22 μm.

Based on an end solution of one hundred parts, glycerol, 8.0 parts, 2-phenylbenzimidazole-5-sulfonic acid, 0.5 parts, 1,2-benzisothiazolin-3-one, 0.2 parts, and water, 88.8 parts, were mixed together by stirring at room temperature until a homogeneous solution was obtained. Next, cyan dye, namely, Direct Blue 199, 2.5 parts, was added into the solution, and the colored ink was stirred for about fifteen minutes until the mixture became homogeneous again. This ink was then filtered under vacuum through a membrane filter with a pore size 0.22 μm.

Based on an end solution of one hundred parts, glycerol, 6.0 parts, 2,2'-dihydroxy-4,4'-dimethoxybenzophenone-5,5'-bis(sodium sulfonate), 0.5 parts, 1,2-benzisothiazolin-3-one, 0.2 parts, and water, 73.7 parts, were mixed together by stirring at room temperature until a homogeneous solution was obtained. Next, yellow dye, Direct Yellow 132, 20.0 parts, was added into the solution, and the colored ink was stirred for about fifteen minutes until the mixture became homogeneous again. This ink was then filtered under vacuum through a membrane filter with a pore size 0.22 μm.

The black ink of Example 1 may be included in this set.

EXAMPLE 7

8.0 g Glycerol, 0.2 g 1,2-benzisothiazolin-3-one, 0.1 g monohydrate hypophosphite sodium salt, 0.25 g 4-bis (polyethoxy)aminoacidpolyethoxy ethyl ester, and 89.35 g water were mixed together by stirring at room temperature until the mixture was homogeneous. Next, magenta dye, namely, 2.1 g Reactive Red 180, was added into the solution. The colored ink was stirred for about fifteen minutes until the mixture became homogeneous again. This ink was then filtered under pressure through a membrane filter with a pore size 0.22 μm.

Based on an end solution of one hundred parts, glycerol, 8.0 parts, 2-phenylbenzimidazole-5-sulfonic acid, 0.5 parts, 1,2-benzisothiazolin-3-one, 0.2 parts, and water, 88.8 parts, were mixed together by stirring at room temp homogeneous solution was obtained. Next, cyan dye, namely, Direct Blue 199, 2.5 parts, was added into the solution, and the colored ink was stirred for about fifteen minutes until the mixture became homogeneous again. This ink was then filtered under pressure through a membrane filter with a pore size 0.22 μm.

Based on an end solution of one hundred parts, glycerol, 6.0 parts, 2,2'-dihydroxy-4,4'-dimethoxybenzophenone-5,5'-bis(sodium sulfonate), 0.5 parts, 2-methyl-4,5-trimethylene-4-isothiazolin-3-one, 0.2 parts, and water, 73.7 parts, were mixed together by stirring at room temperature until a homogeneous solution was obtained. Next, yellow dye, Direct Yellow 132, 20.0 parts was added into the solution, and the colored ink was stirred for about fifteen minutes until the mixture became homogeneous again. This ink was then filtered under pressure through a membrane filter with a pore size 0.22 μm.

The black ink of Example 1 may be included in this ink set.

For each of the examples, colorant optimization was sought, as indicated by the results listed in Table 1.

TABLE 1

Lightfastness of Different Printed Colorant Inks

Colors % Loss

| Dye | CMY | | Yellow | Magenta | Cyan | Red | | Green | | Blue | |
|---|---|---|---|---|---|---|---|---|---|---|---|
| Example 1 | C | 2.8 | 2.4 | 0.9 | 1.2 | M 1.1 | | C 0.2 | | C 0.7 | |
|  | M | 4.0 | | | | Y 0.6 | | Y 0 | | M 3.2 | |
|  | Y | 0.2 | | | | | | | | | |
| Example 2 | | 0.9 | 4.6 | 12.3 | 4.0 | 6.9 | | 1.4 | | 0.1 | |
|  | | 5.7 | | | | 5.0 | | 2.9 | | 7.1 | |
|  | | 4.5 | | | | | | | | | |
| Example 3 | | 0 | 6.3 | 48.3 | 0.9 | 28.6 | | 0 | | 3.0 | |
|  | | 8.4 | | | | 3.4 | | 4.1 | | 18.4 | |
|  | | 1.4 | | | | | | | | | |
| Example 4 | | 0 | 2.1 | 0.2 | 0.7 | 0 | | 0.9 | | 0 | |
|  | | 0.8 | | | | 0 | | 0 | | 2.0 | |
|  | | 0 | | | | | | | | | |
| Example 5 | | 8.1 | 6.5 | 0.9 | 0.8 | 4.5 | | 5.8 | | 1.8 | |
|  | | 11.0 | | | | 5.4 | | 9.8 | | 2.9 | |
|  | | 10.9 | | | | | | | | | |
| Example 6 | | 0 | 1.2 | 0 | 0.7 | 0 | | 0.3 | | 0 | |
|  | | 0 | | | | 2.3 | | 0.5 | | 0 | |
|  | | 0 | | | | | | | | | |
| Example 7 | | 3.0 | 1.5 | 6.0 | 0.9 | 5.0 | | 0.9 | | 1.6 | |
|  | | 4.2 | | | | 3.5 | | 1.2 | | 3.6 | |
|  | | 5.0 | | | | | | | | | |

The color densities indicated in Table 1 are based on the color density of an ink jet printed test target as tested before and after fading. The letters "C", "M", and "Y" indicate the cyan, magenta, and yellow dye as disclosed in the corresponding example. Red, green and blue dyes are obtained by mixing equal amounts of inks indicated in the columns corresponding to such headings. The numerical amounts reflect the percentage color density loss after 24 hours of fading in an Atlas SunTest CPS at 63° C., 765 W/M$^2$.

Since magenta is typically the colorant most vulnerable to light, an extensive study was conducted on magenta ink. A few magenta dyes were evaluated in the vehicle as described in Example 5. The lightfastness of these dyes are listed in Table 2 and Table 3. In the data recorded in Table 2, "A" represents the least amount of fading and "D" the worst.

TABLE 2

Magenta Color Density Loss After One Cycle Light Exposure

| Dyes | Lightfastness | Dyes | Lightfastness |
|---|---|---|---|
| Acid Red 1 | B | Reactive Red 23 | A |
| Acid Red 37 | A | Reactive Red 24 | B |
| Acid Red 58 | D | Reactive Red 58 | B |
| Acid Red 289 | A | Reactive Red 65 | C |
| Basic Red 22 | D | Reactive Red 66 | C |
| Basic Red 46 | D | Reactive Red 120 | B |
| Direct Red 75 | A | Reactive Red 152 | B |
| Direct Red 212 | A | Reactive Red 159 | C |
| Reactive Red 141 | A | Reactive Red 180 | B |
| Reactive Red 198 | B | Reactive Red 195 | A |
| Reactive Red 239 | B | | |

TABLE 3

Magenta Catalytic Fading Results
in Composite Black under Lamination[1]

| Dyes | Catalytic Fading[2] | Dyes | Catalytic Fading |
|---|---|---|---|
| Acid Red 1 | + | Reactive Red 23 | + |
| Acid Red 37 | + | Reactive Red 24 | + |
| Acid Red 289[3] | + | Reactive Red 58 | + |
| Direct Red 75 | + | Reactive Red 180 | − |
| Direct Red 212 | − | Reactive Red 195 | + |
| Reactive Red 141 | + | | |

1. The fading experiment is conducted either in fadometer (50 Cycles) or in real world weathering test (100 days in Miami and Phoenix).
2. The catalytic fading is defined as significantly higher % Loss of Optical Density of magenta in composite black than the single printed color magenta itself.
3. Acid Red 289 accelerated yellow fading whenever it was combined with yellow dye.
4. A magenta dye from Ilford Imaging Switzerland GmbH.

In order to provide superior lightfastness, it is desirable to use a printing substrate substantially free of carbonyl impurities to reduce colorant fading promoted by the medium. One substantially carbonyl-free medium is UVGlossy paper available from American Ink Jet Corporation.

The lightfast performance of ink jet inks disposed on different ink jet glossy media is presented in Table 4.

TABLE 4

Lightfast Ink Performance on Different Printing Media

| | Color Density Loss % | | | | | | |
|---|---|---|---|---|---|---|---|
| Medium | CMY | Y | M | C | R(MY) | G(CY) | B(CM) |
| Rexam Graphics | 5.4 | | | | 4.1 | 5.0 | 4.1 |
| | 9.3 | 5.4 | 4.3 | 2.5 | 5.4 | 5.7 | 9.6 |
| | 5.8 | | | | | | |

TABLE 4-continued

Lightfast Ink Performance on Different Printing Media

| Medium | CMY | Y | M | C | R(MY) | G(CY) | B(CM) |
|---|---|---|---|---|---|---|---|
| ColorSpan Coated Glass | 3.4<br>2.4<br>3.4 | 9.1 | 4.0 | 1.0 | 2.2<br>7.2 | 2.4<br>5.9 | 1.1<br>2.1 |
| Ilford IlfoJet SMWF7 | 1.8<br>3.5<br>6.4 | 8.6 | 1.1 | 3.1 | 4.4<br>6.4 | 1.9<br>4.8 | 0<br>1.8 |
| Ilford IlfoJet SMGP7 | 7.6<br>6.2<br>9.0 | 14.2 | 6.1 | 1.8 | 13.9<br>17.3 | 2.2<br>8.4 | 1.6<br>2.1 |
| American Ink Jet Corp., UV-Glossy | 0<br>4.0<br>0.9 | 5.6 | 0 | 1.0 | 0<br>1.7 | 0.6<br>2.7 | 0.4<br>0.9 |
| National Graphics Photo Glossy | 5.9<br>1.6<br>7.2 | 11.8 | 0.7 | 0.1 | 0<br>11.0 | 2.1<br>10.8 | 1.7<br>1.1 |

It is known to those of experience in the art that the addition of a biocide to ink jet inks helps prevent growth of bacteria in the ink that may cause clogging of ink jet printers. However, biocides normally used in ink formulation may result in acceleration of colorant fading. Accordingly, a need exists for a biocide that does not cause colorant fading. Biocides that have been determined not to cause colorant fading under experiment include 1,2-benzisothiazolin-3-one, 2-methyl-4,5-trimethylene-4-isothiazolin-3-one), 1-(3-chloroallyl)-3,5,7-triaza-1-azoniaadamantane), and 6-acetoxy-2,4-dimethyl-1,3-dioxane biocides.

EXAMPLE 8

Based on an end solution of one hundred parts, glycerol, 8.0 parts, 2-phenylbenzimidazole-5-sulfonic acid, 0.5 parts, 1,2-benzisothiazolin-3-one, 0.2 parts, and water, 88.8 parts, were mixed together by stirring at room temperature until a homogeneous solution was obtained. Next, cyan dye, namely, Direct Blue 199, 2.5 parts, was added into the solution, and the colored ink was stirred for about fifteen minutes until the mixture became homogeneous again. This ink was then filtered under pressure through a membrane filter with a pore size 0.22 μμm.

Based on an end solution of one hundred parts, glycerol, 6.0 parts, monohydrate hypophosphite sodium salt, 0.1 parts, 1,2-benzisothiazolin-3-one, 0.2 parts, 4-bis(polyethoxy)aminoacidpolyethoxy ethyl ester, 0.25 parts, and water, 85.7 parts, were mixed together by stirring at room temperature until a homogeneous solution was obtained. Next, magenta dye, namely, Direct Red 75, 8.0 parts, was added into the solution, and the colored ink was stirred for about fifteen minutes until the mixture became homogeneous again. This ink was then filtered under pressure through a membrane filter with a pore size 0.22 μm.

Based on an end solution of one hundred parts, glycerol, 6.0 parts, 2,2'-dihydroxy-4,4'-dimethoxybenzophenone-5,5'-bis(sodium sulfonate), 0.5 parts, 2-methyl-4,5-trimethylene-4-isothiazolin-3-one, 0.2 parts, and water, 73.7 parts, were mixed together by stirring at room temperature until a homogeneous solution of the mixture was obtained. Next, yellow dye, Direct Yellow 132, 20.0 parts, was added into the solution, and the colored ink was stirred for about fifteen minutes until the mixture became homogeneous again. This ink was then filtered under pressure through a membrane filter with a pore size 0.22 μm.

EXAMPLE 9

Example 8 inks were modified by substituting 1,2-benzisothiazolin-3-one with 0.2 parts 2-methyl-4,5-trimethylene-4-isothiazolin-3-one and 0.1 part triethanolamine.

Fading comparison of Examples 8 and 9 are shown in Table 5.

TABLE 5

Effects of Biocides on Ink Lightfastness

| Biocide | CMY | Y | M | C | R(MY) | G(CY) | B(CM) |
|---|---|---|---|---|---|---|---|
| Example 8 | 0<br>4.0<br>0.9 | 5.6 | 0 | 1.0 | 0<br>1.7 | 0.6<br>2.7 | 0.4<br>0.9 |
| Example 9 | 3.8<br>2.0<br>0.5 | 3.6 | 1.2 | 1.6 | 0.7<br>5.1 | 0<br>4.0 | 0<br>2.1 |

The letter codes and numerical amounts have the meanings indicated in connection with Table 1.

It is known to those of skill in the art that a humectant, or organic solvent, may be desirable in an ink formulation for an ink jet printer. A humectant may help solubilize the dye and prevent the ink from drying on the nozzle of an ink jet printer, e.g., continuous, thermal, or piezo-electric printers. The selected humectant may have a significant effect on the lightfastness of the ink to which the humectant is added and/or to the other inks in the ink set used in the final print. In testing, ink colorant generally faded faster when polyethers were used as humectants, even despite the presence of a UV absorbent. Humectants may also affect the tendency of dye molecules to aggregate, and thus affect lightfastness, as aggregated groups of molecules have significantly less surface area per unit mass than individual molecules, and a particular molecule within such an aggregated group is less likely to undergo photodegradation.

EXAMPLE 10

To 88.8 g water, 8.0 g humectant, 0.1 g triethanolamine, and 2-methyl-4,5-trimethylene-4-isothiazolin-3-one were added, and the obtained system was mixed by stirring until a clear solution was achieved. Next, a cyan dye, namely, 2.9 g Direct Blue 199, was put in the solution, and the mixture was stirred for about 15 minutes at room temperature to obtain a homogeneous ink. This ink was then filtered under pressure through a membrane filter with a pore size 0.22 μm.

The following respective components were mixed, and the resultant mixtures were filtered under pressure through a membrane filter having a pore size of 0.22 μm, to obtain analogous inks of different colors.

For a magenta ink, the following components were mixed: a magenta dye, namely, Direct Red 75, 8.0 parts, glycerol, 6.0 parts, triethanolamine, 0.1 parts, 2-methyl-4, 5-trimethylene-4-isothiazolin-3-one, 0.2 parts, and water, 85.7 parts. For a yellow ink, a yellow dye, namely Direct Yellow 132, 20.0 parts, glycerol, 6.0 parts, triethanolamine, 0.1 parts, 2-methyl-4,5-trimethylene-4-isothiazolin-3-one, 0.2 parts, and water, 73.7 parts.

Examples 9 to Example 16 contained the same magenta and yellow inks as Example 8, but different humectants were used in the cyan inks. In particular, di(ethylene glycol), tri(ethylene glycol), poly(ethylene glycol)200, propylene glycol, di(propylene glycol), poly(propylene glycol)425, N-methylpyrrolidone, and glycerol, respectively, were used instead of ethylene glycol as humectants.

Light fading results for different humectants are presented in Table 6.

TABLE 6

Effect of Humectants on Ink Lightfastness

| Humectants | CMY | Y | M | C | R(MY) | G(CY) | B(CM) |
|---|---|---|---|---|---|---|---|
| Ethylene Glycol | 20.8 | | | | 1.8 | 1.7 | 6.4 |
| | 8.9 | 2.9 | 0.4 | 6.9 | 6.9 | 3.6 | 0.9 |
| | 12.6 | | | | | | |
| Di(ethylene glycol) | 0 | | | | 4.2 | 3.1 | 1.1 |
| | 6.9 | 3.1 | 2.5 | 0 | 5.9 | 3.3 | 5.4 |
| | 0 | | | | | | |
| Poly(ethylene glycol)-200 | 6.6 | | | | 2.4 | 0 | 8.8 |
| | 6.4 | 0.5 | 0.3 | 3.4 | 2.5 | 0 | 5.3 |
| | 1.8 | | | | | | |
| Propylene Glycol | 10.3 | | | | 0.1 | 1.9 | 2.0 |
| | 5.7 | 1.8 | 0 | 0.5 | 1.9 | 3.2 | 1.1 |
| | 6.5 | | | | | | |
| Di(propylene glcyol) | 0.9 | | | | 0 | 11.0 | 14.7 |
| | 1.9 | 2.0 | 7.7 | 3.2 | 0 | 1.5 | 8.9 |
| | 0 | | | | | | |
| Poly(propylene glycol)-425 | 1.0 | | | | 3.0 | 2.6 | 0 |
| | 3.8 | 0 | 2.4 | 1.4 | 2.7 | 0 | 3.4 |
| | 0.6 | | | | | | |
| N-Methyl pyrrolidone | 5.8 | | | | 0 | 2.9 | 10.9 |
| | 3.0 | 11.8 | 1.1 | 2.1 | 8.7 | 7.7 | 2.4 |
| | 9.2 | | | | | | |
| 2-Pyrrolidone | 10.7 | | | | 1.2 | 7.0 | 12.6 |
| | 18.2 | 0 | 1.6 | 13.6 | 1.0 | 4.7 | 10.8 |
| | 12.3 | | | | | | |
| Glycerol | 5.0 | | | | 2.1 | 1.0 | 3.0 |
| | 7.2 | 1.9 | 3.5 | 8.0 | 6.9 | 1.2 | 5.0 |
| | 3.4 | | | | | | |

The letter codes and numerical amounts have the same meanings as in Table 1.

A certain degree of colorant aggregation on the printing medium can improve its lightfastness. In the present invention, a variety of surfactants with cationic charge were used in the ink formulation to induce aggregation. Without being bound to any particular mechanism, it is believed that dye molecules with anionic charges may coordinate with the added giant cationic charged surfactant to form some aggregates. The colorant of ink is therefore believed to be protected from fading by the presence of an appropriate surfactant. Use of a greater amount of surfactant than was used in the following experiments may increase the effect of the surfactant on the lightfastness of the ink.

EXAMPLE 11

The same magenta and yellow inks were used as in Example 10. For a cyan ink, the following components were included. To 88.5 g water, 8.0 g glycerol, 0.1 g triethanolamine, 2-methyl-4,5-trimethylene-4-isothiazolin-3-one and 0.2–0.3 g surfactants were added in, and the obtained system was mixed by stirring until a clear solution was achieved. Then a cyan dye, namely 2.9 g Direct Blue 199, was added, and the mixture was stirred for about fifteen minutes room temperature to obtain a homogeneous ink. This ink was then filtered under pressure through a membrane filter with a pore size 0.22 $\mu$m.

Fading results for example 11 are illustrated in Table 7.

TABLE 7

Effect of Charged Surfactants on Ink Lightfastness

| Surfactants | CMY | Y | M | C | R(MY) | G(CY) | B(CM) |
|---|---|---|---|---|---|---|---|
| Witco EMCOL CC-36 (polyoxypropylene methyl diethyl ammonium chloride) | 24.5 | | | | 0 | 0 | 10.2 |
| | 1.2 | 0.8 | 2.2 | 2.3 | 0.6 | 3.8 | 2.2 |
| | 0.9 | | | | | | |
| Witco EMCOL CC-9 (polyoxypropylene methyl diethyl ammonium chloride) | 27.1 | | | | 0.3 | 1.0 | 6.2 |
| | 5.0 | 0 | 0 | 0.3 | 1.5 | 0.5 | 0 |
| | 2.4 | | | | | | |
| Pilot Calfax | 15.2 | | | | 0 | 1.8 | 0 |
| | 4.0 | 2.1 | 0 | 0 | 0.9 | 3.3 | 0 |
| | 6.0 | | | | | | |
| Surfynol 504 (a nonionic surfactant) | 22.2 | | | | 0 | 1.7 | 0 |
| | 8.4 | 3.1 | 0 | 2.6 | 3.6 | 0.1 | 19.5 |
| | 8.3 | | | | | | |
| Tergitol 15-S-12 (alkyloxypolyethyl eneoxyethanol) | 24.0 | | | | 1.4 | 16.4 | 16.3 |
| | 3.0 | 2.2 | 10.6 | 2.1 | 4.5 | 0 | 2.1 |
| | 3.3 | | | | | | |
| Control | 5.0 | | | | 2.1 | 1.0 | 3.0 |
| | 7.2 | 1.9 | 3.5 | 8.0 | 6.9 | 1.2 | 5.0 |
| | 3.4 | | | | | | |

The letter codes and numerical amounts have the meanings indicated in connection with Table 1.

One of the most effective means of protecting a colorant ink is the addition of a light stabilizer, such as a Hindered Amine Light Stabilizer ('HALS') or an ultraviolet absorber. An ultraviolet absorber may be selected that is capable of absorbing energy at the excitation energy of the dye that is used in a particular ink, so that the UV absorber absorbs some energy, in the form of light, that would otherwise excite an electron in the particular dye, making the dye more likely to react with another component of the ink, and promoting in catalytic fading. It is generally accepted by those of skill in the art that the most unstable colorants are primarily faded by radiation in the 400 nm to 800 nm range (visible light). For stable colorants, such as those disclosed herein, it is generally accepted that photodegradation is primarily caused by exposure to higher energy, ultraviolet radiation (UV=290 nm–400 nm). Light-stabilizing additives can absorb and then harmlessly dissipate thermally the incident ultraviolet radiation that might otherwise contribute to photodegradation, and/or can provide a more active component which is more easily oxidized or reduced by the absorption of higher UV energy either directly or from an intermediate. Thus, the colorant can be 'shielded' from the damage of UV radiation exposure. Accordingly, in order to improve lightfastness in stable colorants, it is desirable to reduce fading due to ultraviolet light.

There are many commercially available water-soluble UV stabilizers. The selection of a UV stabilizer for an ink set may include one of the water soluble and colorless or very lightly colored compounds. Each UV stabilizer has a distinct effect on individual inks containing different colorants. A series of studies were conducted to investigate the lightfastness improvement attendant upon the addition of UV stabilizer to ink.

It may also be desirable to use quenchers and antioxidants to diminish the effect of oxygen on the dye, particularly where visible light contributes to fading. Many quenchers are not water soluble, so it may be desirable to coat the printing medium with a quencher, such as a nickel-based complex, in order to obtain the desired effect. Antioxidants such as hypophosphite may particularly improve performance of certain dyes that are susceptible to oxidation, such as magenta dyes. In general, it is desirable to provide quenchers and antioxidants that absorb at particular energy levels that correspond to excitation energy levels of the ink components.

It was found that 2,2'-dihydroxy-4,4'-dimethoxybenzophenone-5,5'-bis(sodium sulfonate works well for the yellow dye Direct Yellow 132. 4-Bis(polyethoxy)aminoacidpolyethoxy ethyl ester was suitable for the magenta dye Direct Red 75. Hypophosphite can enhance lightfastness of magenta ink. 2-Phenylbenzimidazole-5-sulfonic acid was a suitable UV absorber for the Direct Blue 199 contained in the cyan ink.

EXAMPLE 12

The inks of Example 8 were used, but different UV absorbers were added in place of the UV absorbers identified in Example 8. Fading results for different UV absorbers are listed in Table 8.

TABLE 8

Effects of UV Stabilizers on Ink Lightfastness

| UV-Stabilizers | CMY | Y | M | C | R(MY) | G(CY) | B(CM) |
|---|---|---|---|---|---|---|---|
| Uvinul MS40 | 2.7 |   |   |   | 0 | 0 | 0 |
|   | 0 | 0 | 0.7 | 0.7 | 0 | 0 | 1.2 |
|   | 0 |   |   |   |   |   |   |
| Uvinul P25 | 0 |   |   |   | 0 | 0 | 0 |
|   | 2.2 | 7.2 | 1.0 | 1.1 | 1.8 | 3.6 | 2.1 |
|   | 1.6 |   |   |   |   |   |   |
| Uvinul 3048 | 3.4 |   |   |   | 1.7 | 0.9 | 1.8 |
|   | 3.8 | 0 | 0 | 4.6 | 5.2 | 2.5 | 3.1 |
|   | 3.4 |   |   |   |   |   |   |
| Givsorb UV-16 | 0 |   |   |   | 0 | 0.9 | 0 |
|   | 4.2 | 5.1 | 1.1 | 5.8 | 1.3 | 3.0 | 3.1 |
|   | 1.9 |   |   |   |   |   |   |
| Hypophosphite | 1.7 |   |   |   | 1.8 | 1.4 | 0 |
|   | 2.0 |   |   |   |   |   |   |
|   | 0.6 | 6.4 | 1.5 | 2.1 | 5.0 | 3.0 | 3.0 |
| Histidine | 5.5 |   |   |   | 0 | 1.2 | 2.6 |
|   | 1.5 | 0 | 0.3 | 0 | 1.1 | 0 | 1.7 |
|   | 1.5 |   |   |   |   |   |   |
| Nickle Coating | 3.2 |   |   |   | 0.1 | 1.7 | 3.5 |
|   | 0.9 | 4.9 | 0 | 0.2 | 3.7 | 2.9 | 3.8 |
|   | 0 |   |   |   |   |   |   |
| Cupric Sulfate | 2.0 |   |   |   | 0 | 2.9 | 3.3 |
|   | 0.3 | 0 | 0 | 2.1 | 0 | 0 | 0.7 |
|   | 0 |   |   |   |   |   |   |
| Control | 5.0 |   |   |   | 2.1 | 1.0 | 3.0 |
|   | 7.2 | 1.9 | 3.5 | 8.0 | 6.9 | 1.2 | 5.0 |
|   | 3.4 |   |   |   |   |   |   |

The letter codes and numerical amounts have the meanings indicated in connection with Table 1.

It should be understood that a variety of different constituents can be used to form ink sets that can, in connection with a substantially carbonyl-free medium, be used to provide improved lightfastness. Cosolvents or humectants that can be used include but are not limited to: glycerol, 2-propanol, 1,4-butanediol, 1,5-pentanediol, ethanol, N-methylpyrrolidone, 2-pyrrolidone, propylene glycol, di(propylene glycol), poly(propylene glycol) mw200–1200, ethylene glycol, diethylene glycol, tri(ethylene glycol), Poly(ethylene glycol) mw200–1200, pentaerythritol, 1,3-dimethyl-2-imidazolidinone, ethoxylate (3/4 EO/OH), triethylene glycol, poly(ethylene glycol)-300, 2-pyrrolidone, thiodiglycol, dimethyl imidazolidinone, glycerin, acetamide, urea, N-methyl urea, N-allyl urea, ethoxylated glycerin, sorbitol, ethoxylated glucose, dimethoxyethane, diethoxyethane, ethyleneglycol diacetate, and glycinamide hydrochloride. Anionic, cationic, and non-ionic water soluble surfactants with HLB values greater than 12: available surfactants include but are not limited to Surfynol 420, 440, 465, 485, 502, 504, SE-F, DF-110D (available from Air Product and Chemicals Inc.), Tergitol 15-S-7, 15-S-9, 15-S-12, 15-S- 15, 15-S-20, 15-S-30, 15-S-40 (Union Carbide Chemicals & Plastics Company Inc.), Pilot Calfax 16L-35 and 10L-45 (Pilot Chemical Company), Witcol EMCOL CC9 (Witco Corporation), Witco EMCOL CC36 (Witco Corporation), Dowfax 2A1 (The Dow Chemical Company), and Iconol NP-30, NP-40, NP-50, NP70, NP100, DA-6, DA-9, TDA-8, TDA-9, TDA- 10 (BASF Corporation). Commercially available UV stabilizers include but are no limited to Givsorb UV-14, UV-16 (Givaudan-Roure Corporation), Benzophenone-4 available as Uvinul MS-40 (5-benzoyl-4-hydroxy-2-methoxybenzenesulfonic acid; BASF) and Escalol 577(ISP Van Dyk), Uvinul P25, DS49, 3048, 4049H, 4050H (BASF Corporation), Eusolex 232 (E.M. Industries Inc.), PM-61 (H.W. Sands Corporation), Cradasome A/E (Croda Inc.), dihydroxyacetone (E.M. Industries Inc.), Lipo Melanin 10% Soln (Lipo Chemicals Inc.), Uvasorb SP, WP (3V, Inc.), Tinuvin 1130, 384, 292 (Ciba Additives), Cyasorb UV1084 (Cytec), PM-61 (H W Sands), Sanduvor 3041 (Clariant), Parsol HS (Givaudan Roure), and UVChek AM 104 (Ferro Corporation). Commercially available dyes include but are not limited to Intrajet Liquid Turquoise GLLIJ (Crompton & Knowles Colors Inc.), Duasyn Direct Turquoise Blue FRLSF (Clariant), Bayscript Cyan BA (Bayer), Keyamine Black G Pure Liquid (Keystone), Zeneca Yellow ProJet 1G (Zeneca), Intrajet Liquid Yellow A2G (Crompton & Knowles Colors Inc.), Daiwa IJ Red 319H (Daiwa Dyestuffs), BayScript Magenta LFB (Bayer), SandovocL Brilliant Red A4G (Clariant Corp.), SandovocL Red 10BL (Clariant), SandovocL Brilliant Red R/K 8B (Clariant Corp.), Sirius Supra Red F4BL (Bayer), Nylomine Red A4B (D&G Dyestuffs), Duasyn Brilliant Red 3BSF (Clariant), Duasyn Brilliant Yellow GLSF (Clariant,) and Reactive Red 152 (Ciba Specialty Chemicals). Commercially available media include Ilford photoglossy, LaserMaster Photo Glossy, American Ink Jet Photo Glossy, Encad QIS Photo, Polaroid Photo Glossy, Rexam Photo Glossy, and American Ink Jet Corporation UV Glossy.

The above ink sets containing Direct Blue 199, Direct Red 75, Direct Yellow 132, and Direct Black 19 as colorants showed good lightfastness when exposed to sunlight without lamination, but the magenta color was accelerated to fade by cyan in the presence of lamination. Our further experiment suggested that the interaction of Direct Blue 199 with glue components generated active species which initiate Direct Red 75 to fade. A series of phthalocyanine copper complex dyes were investigated and all were found to contribute to catalytic fading of Direct Red 75 under lamination in sunlight. To eliminate the possibility of catalytic fading between copper complex and azo Direct Red 75, a magenta dye with copper complex structure, Reactive Red 23, was used to replace Direct Red 75. Since the color space of Reactive Red 23 is inferior to Direct Red 75, a second dye with superior color space such as Reactive Red 152, or Reactive Red 180 or Acid Red 289 is added to the magenta ink. The obtained ink with two-dye colorant provided good lightfastness and color space.

EXAMPLE 15

Based on an end solution of one hundred parts, glycerin, 8.0 parts, 2-phenylbenzimidazole-5-sulfonic acid, 0.5 parts, 1,2-benzisothiazolin-3-one, 0.2 parts, 2-propanol, 1.5 parts, Surfynol 504, 0.005 parts, and water, 87.295 parts, were mixed together by stirring at room temperature until a homogeneous solution was obtained. Next, cyan dye, namely, Direct Blue 199, 2.5 parts, was added into the solution, and the colored ink was stirred for about fifteen minutes until the mixture became homogeneous again This ink was then filtered under pressure through a membrane filter with a pore size 0.22 μm.

Based on an end solution of one hundred parts, glycerin, 8.0 parts, 1,2-benzisothiazolin-3-one, 0.2 parts, sodium decyl diphenyl oxide disulfonate, 0.3 parts, and water, 71.5 parts, were mixed together by stirring at room temperature until a homogeneous solution was obtained. Next, black dye, Direct Black 19, 20.0 parts, was added into the solution, and the colored ink was stirred for about fifteen minutes until the mixture became homogeneous again. This ink was then filtered under pressure through a membrane filter with a pore size 0.22 μm.

Based on an end solution of one hundred parts, Glycerin, 8.0 parts, 2,2'-dihydroxy4,4'-dimethoxybenzophenone-5,5'-bis(sodium sulfonate), 0.5 parts, 1,2-benzisothiazolin-3-one, 0.2 parts, Surfynol 504, 0.005 parts, and water, 71.295 parts, were mixed together by stirring at room temperature until a homogeneous solution was obtained. Next, yellow dye, Direct Yellow 132, 20.0 parts, was added into the solution, and the colored ink was stirred for about fifteen minutes until the mixture became homogeneous again. This ink was then filtered under pressure through a membrane filter with a pore size 0.22 μμm.

Based on an end solution of one hundred parts, Reactive Red 152, 1.0 parts; Reactive Red 180, 1.16 parts; glycerin, 8.0 parts; monohydrate hypophosphite sodium salt, 0.1 parts; 1,2-benzisothiazolin-3-one, 0.2 parts; 4-bis(polyethoxy)aminoacidpolyethoxy ethyl ester, 1.0 parts, Surfynol 504, 0.005 parts; and water, 88.535 parts, were mixed together by stirring at room temperature until-a homogeneous solution of the mixture was obtained, the colored was then filtered under pressure through a membrane filter with a pore size 0.22 μm.

While the invention has been disclosed in connection with the preferred embodiments shown and described in detail, various modifications and improvements thereon will become readily apparent to those skilled in the art. Accordingly, the spirit and scope of the present invention is to be limited only by the following claims.

We claim:

1. An ink suitable for ink jet printing, comprising
   an aqueous vehicle,
   a dye having an excitation energy, and
   a stabilizer capable of absorbing energy of wavelengths similar to the excitation energy of the dye.
2. The ink of claim 1, wherein the dye is substantially lightfast.
3. The ink of claim 1, wherein the dye is a phthalocyanine dye.
4. The ink of claim 1, wherein the dye is an azo dye.
5. The ink of claim 1, wherein the ink includes two magenta dyes, of which one dye includes a copper complex.
6. The ink of claim 1, wherein the ink further comprises a biocide, whereby the dye is substantially lightfast in the presence of the biocide.
7. The ink of claim 6, wherein the biocide is selected from 1,2-benzisothiazolin-3-one, 2-methyl-4,5-trimethylene-4-isothiazolin-3-one, 1-(3-chloroallyl)-3,5,7-triaza-1-azoniaadamantane, and 6-acetoxy-2,4-dimethyl-1,3-dioxane.
8. The ink of claim 1, wherein the ink further comprises a humectant, whereby fading of the dye is not promoted in the presence of the humectant.
9. The ink of claim 8, wherein the humectant is selected from glycerin, propylene glycol, ethylene glycol, 1,5-pentanediol, di(ethylene glycol), poly(ethylene glycol)-200, poly(propylene glycol)-425, di(propylene glycol), propylene glycol, triethylene glycol, poly(ethylene glycol)-300, 2-pyrrolidone, thiodiglycol, dimethyl imidazolidinone, glycerin, acetamide, urea, N-methyl urea, N-allyl urea, ethoxylated glycerin, sorbitol, ethoxylated glucose, dimethoxyethane, diethoxyethane, ethyleneglycol diacetate, and glycinamide hydrochloride.
10. The ink of claim 8, wherein the dye is a yellow dye and the ink is substantially free of N-methylpyrrolidone.
11. The ink of claim 1, wherein the ink further comprises a surfactant, and wherein the dye is substantially lightfast in the presence of the surfactant.
12. The ink of claim 11, wherein the surfactant is selected from non-ionic surfactants, sodium decyl diphenyl oxide disulfonate, alkyloxypolyethyleneoxyethanol, and polyoxypropylene methyl diethyl ammonium chloride.
13. An ink according to claim 1, comprising a yellow dye and at least one light stabilizer selected from 2,2'-dihydroxy-4,4'-dimenthoxybenzophenone-5,5'-bis(sodium sulfonate), 5-benzoyl-4-hydroxy-2-methoxybenzenesulfonic acid, histidine, and cupric sulfate.
14. The ink of claim 13, wherein the yellow dye comprises Reactive Yellow 37, Direct Yellow 107, Acid Yellow 17, Direct Yellow 86, or Direct Yellow 132.
15. An ink according to claim 1, comprising a magenta dye and at least one light stabilizer selected from a 4-bis(polyethoxy)aminoacidpolyethoxyethyl ester, 2,2'-dihydroxy-4,4'-dimenthoxybenzophenone-5,5'-bis(sodium sulfonate), 5-benzoyl-4-hydroxy-2-methoxybenzenesulfonic acid, 2-phenylbenzimidazole-5-sulfonic acid, histidine, and cupric sulfate.
16. The ink of claim 15, wherein the magenta dye comprises Direct Red 75, Reactive Red 23, Reactive Red 180, Direct Red 212, Acid Red 52, Acid Red 37, or Acid Red 289.
17. An ink according to claim 1, comprising a cyan dye and at least one light stabilizer selected from 2-phenylbenzimidazole-5-sulfonic acid, 5-benzoyl-4-hydroxy-2-methoxybenzenesulfonic acid, 4-bis(polyethoxy)aminoacidpolyethoxyethyl ester, and 5-benzoyl-4-hydroxy-2-methoxybenzenesulfonic acid.
18. The ink of claim 17, wherein the cyan dye comprises Direct Blue 199 or Direct Blue 86.
19. A method for printing, comprising
    preparing an ink jet printer with an ink according to claim 1,
    disposing a sheet of substantially carbonyl-free paper in the printer, and
    depositing the ink on the paper.
20. An ink jet printer comprising an ink according to claim 1.
21. The ink jet printer of claim 20, further comprising paper that is substantially free of carbonyls.
22. An ink jet printer cartridge comprising an ink according to claim 1.

23. The ink set suitable for ink jet printing, comprising
a cyan ink including a substantially lightfast cyan dye,
a magenta ink including a substantially lightfast magenta dye, and
a yellow ink including a substantially lightfast yellow dye wherein at least one ink further includes an ultraviolet absorber, selected such that the ultraviolet absorber is capable of absorbing energy at a wavelength similar to the excitation energy of the dye in the at least one ink.

24. An ink jet cartridge comprising an ink set of claim 23.

25. An ink jet printer loaded with an ink set of claim 23.

26. The ink jet printer of claim 25, further loaded with paper substantially free of carbonyls.

27. A method for printing, comprising
preparing an ink jet printer with an ink set according to claim 23,
loading a sheet of substantially carbonyl-free paper into the printer, and
disposing ink from the ink set on the paper.

28. A residue disposed on a surface, the residue comprising
a dye having an excitation energy, and
a stabilizer capable of absorbing energy of wavelengths similar to the excitation energy of the dye.

29. The residue of claim 28, wherein the surface is paper.

30. The residue of claim 28, wherein the paper is substantially free of carbonyls.

31. The residue of claim 28, wherein the dye is substantially lightfast in the presence of the other components of the residue.

32. The residue of claim 28, wherein the dye is a phthalocyanine dye.

33. The residue of claim 28, wherein the dye comprises an azo dye.

34. The residue of claim 28, wherein the residue comprises two magenta dyes, of which one dye includes a copper complex.

35. The residue of claim 28, wherein the residue further comprises a biocide, whereby the dye is substantially lightfast in the presence of the biocide.

36. The residue of claim 28, wherein the biocide is selected from 1,2-benzisothiazolin-3-one, 2-methyl-4,5-trimethylene-4-isothiazolin-3-one, 1-(3-chloroallyl)-3,5,7-triaza-1-azoniaadamantane, and 6-acetoxy-2,4-dimethyl-1,3-dioxane.

37. The residue of claim 28, wherein the residue further comprises a humectant, whereby the dye is substantially lightfast in the presence of the humectant.

38. The residue of claim 37, wherein the humectant is selected from glycerin, propylene glycol, ethylene glycol, 1,5-pentanediol, di(ethylene glycol), poly(ethylene glycol)-200, poly(propylene glycol)-425, di(propylene glycol), propylene glycol, triethylene glycol, poly(ethylene glycol)-300, 2-pyrrolidone, thiodiglycol, dimethyl imidazolidinone, glycerin, acetamide, urea, N-methyl urea, N-allyl urea, ethoxylated glycerin, sorbitol, ethoxylated glucose, dimethoxyethane, diethoxyethane, ethyleneglycol diacetate, and glycinamide hydrochloride.

39. The residue of claim 37, wherein the dye is a yellow dye and the residue is substantially free of N-methylpyrrolidone.

40. The residue of claim 28, wherein the residue further comprises a surfactant, whereby the dye is substantially lightfast in the presence of the surfactant.

41. The residue of claim 40, wherein the surfactant is selected from non-ionic surfactants, sodium decyl diphenyl oxide disulfonate, alkyloxypolyethyleneoxyethanol, and polyoxypropylene methyl diethyl ammonium chloride.

42. The residue of claim 28, further comprising a second dye.

43. The residue of claim 42, wherein each dye is substantially lightfast in the presence of the other dye.

44. An ink according to claim 1, wherein said dye comprises 0.2–10.0 weight % of magenta dye.

45. An ink according to claim 44, wherein the magenta dye includes at least one of Direct Red 75, Reactive Red 23, Reactive Red 180, Direct Red 212, Acid Red 52, Acid Red 37, Acid Red 289, or a water soluble cupric phthalocyanine dye.

46. An ink according to claim 44, wherein the magenta dye or dyes are selected from Direct Red 75, Reactive Red 23, Reactive Red 180, Direct Red 212, Acid Red 52, Acid Red 37, Acid Red 289, and a water soluble cupric phthalocyanine dye.

47. An ink according to claim 1, wherein said ink comprises 0.2–15.0 weight % yellow dye.

48. An ink according to claim 47, wherein the yellow dye includes at least one of Direct Yellow 107, Reactive Yellow 37, Direct Yellow 132, and Direct Yellow 86.

49. An ink according to claim 47, wherein the yellow dye or dyes are selected from Direct Yellow 107, Reactive Yellow 37, Direct Yellow 132, and Direct Yellow 86.

50. An ink according to claim 1, wherein said ink comprises 0.2–10.0 weight % cyan dye.

51. An ink according to claim 50, wherein the cyan dye includes at least one of Direct Blue 199 and Direct Blue 86.

52. An ink according to claim 50, wherein the cyan dye or dyes are selected from Direct Blue 199 and Direct Blue 86.

53. An ink set suitable for ink jet printing, comprising
a cyan ink including substantially lightfast cyan dye and a stabilizer capable of absorbing energy of wavelengths similar to the excitation energy of the cyan dye,
a magenta ink including a substantially lightfast magenta dye and a stabilizer capable of absorbing energy of wavelengths similar to the excitation energy of the magenta dye, and
a yellow ink including a substantially lightfast yellow dye and a stabilizer capable of absorbing energy of wavelengths similar to the excitation energy of the yellow dye.

54. The ink set of claim 53, wherein each ink is an aqueous ink.

* * * * *